US011177669B2

United States Patent
Sung (10) Patent No.: US 11,177,669 B2
(45) Date of Patent: Nov. 16, 2021

(54) APPARATUS AND METHOD FOR BATTERY MODULE EQUALIZATION

(71) Applicant: LG CHEM, LTD., Seoul (KR)

(72) Inventor: Chang Hyun Sung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 185 days.

(21) Appl. No.: 16/462,403

(22) PCT Filed: Jan. 9, 2018

(86) PCT No.: PCT/KR2018/000412
§ 371 (c)(1),
(2) Date: May 20, 2019

(87) PCT Pub. No.: WO2018/216874
PCT Pub. Date: Nov. 29, 2018

(65) Prior Publication Data
US 2019/0356140 A1 Nov. 21, 2019

(30) Foreign Application Priority Data

May 24, 2017 (KR) .................. 10-2017-0064203
Jul. 17, 2017 (KR) .................. 10-2017-0090340

(51) Int. Cl.
*H02J 7/00* (2006.01)
*H01M 10/48* (2006.01)

(52) U.S. Cl.
CPC ......... *H02J 7/0014* (2013.01); *H01M 10/482* (2013.01); *H02J 7/0019* (2013.01)

(58) Field of Classification Search
CPC ...... H02J 7/0014; H02J 7/0019; H02J 7/0016; H01M 10/482; H01M 10/42

USPC ......................................... 320/118
See application file for complete search history.

(56) References Cited

U.S. PATENT DOCUMENTS

| 5,631,534 A * | 5/1997 | Lewis ............... H02J 7/0016 320/103 |
| 6,184,656 B1 * | 2/2001 | Karunasiri ............ B60L 3/0046 320/119 |
| 6,583,602 B2 * | 6/2003 | Imai ..................... H02J 7/0018 320/118 |
| 7,193,392 B2 * | 3/2007 | King ................... H02J 7/0016 320/118 |

(Continued)

FOREIGN PATENT DOCUMENTS

| EP | 2339717 A1 | 6/2011 |
| EP | 3086435 A2 | 10/2016 |

(Continued)

OTHER PUBLICATIONS

Extended European Search Report, dated Nov. 11, 2019, for European Application No. 18806502.3.

(Continued)

*Primary Examiner* — John T Trischler
(74) *Attorney, Agent, or Firm* — Birch, Stewart, Kolasch & Birch, LLP (57) ABSTRACT

An apparatus and a method of equalizing a battery module supplies an equalization current to a battery module which is diagnosed to have abnormality via an equalization current supply circuit when an abnormality is generated in a state of charge (SoC) of one or more battery modules, and equalize the SoC of the one or more battery modules.

18 Claims, 8 Drawing Sheets

(56) References Cited

U.S. PATENT DOCUMENTS

| | | | | |
|---|---|---|---|---|
| 7,245,108 B2* | 7/2007 | Chertok | B60W 10/26 | 320/132 |
| 7,378,818 B2* | 5/2008 | Fowler | B60L 53/11 | 320/119 |
| 7,782,014 B2* | 8/2010 | Sivertsen | B60L 58/22 | 320/118 |
| 8,253,378 B2* | 8/2012 | Lee | H02J 7/0019 | 320/118 |
| 8,294,421 B2* | 10/2012 | Bucur | H02J 7/0019 | 320/116 |
| 8,354,825 B2* | 1/2013 | Lee | H02J 7/0018 | 320/118 |
| 8,390,147 B2* | 3/2013 | Stauth | H02J 3/385 | 307/77 |
| 8,396,609 B2 | 3/2013 | Wang et al. | | |
| 8,547,065 B2* | 10/2013 | Trigiani | H02J 7/0014 | 320/119 |
| 8,648,570 B2* | 2/2014 | Lim | H02J 7/0016 | 320/118 |
| 8,723,480 B2* | 5/2014 | Lim | H02J 7/0019 | 320/118 |
| 8,779,722 B2* | 7/2014 | Lee | H02J 7/0016 | 320/118 |
| 8,872,482 B2* | 10/2014 | Jung | H01M 10/615 | 320/138 |
| 8,947,048 B2* | 2/2015 | Roessler | H02J 7/0016 | 320/116 |
| 8,970,162 B2* | 3/2015 | Kim | H02J 7/0019 | 320/103 |
| 9,048,669 B2* | 6/2015 | Lim | H02J 7/0019 | |
| 9,085,243 B2 | 7/2015 | Chatroux et al. | | |
| 9,172,254 B2* | 10/2015 | Ganor | B60L 58/21 | |
| 9,270,132 B2 | 2/2016 | Yun et al. | | |
| 9,287,723 B2 | 3/2016 | Kang et al. | | |
| 9,362,759 B2* | 6/2016 | Nakao | H01M 10/4207 | |
| 9,444,267 B2* | 9/2016 | Suzuki | H02J 7/0019 | |
| 9,520,613 B2* | 12/2016 | Brockerhoff | H01M 10/441 | |
| 9,876,367 B2* | 1/2018 | Trigiani | H02J 7/0026 | |
| 9,927,492 B2* | 3/2018 | Lupo | G01R 31/3842 | |
| 9,945,910 B2* | 4/2018 | Kiuchi | G01R 31/3835 | |
| 10,396,569 B2* | 8/2019 | Sung | H02J 7/0021 | |
| 10,446,880 B2* | 10/2019 | Sung | H01M 10/44 | |
| 10,461,546 B2* | 10/2019 | Min | H02J 7/342 | |
| 10,680,447 B2* | 6/2020 | Yang | H02J 7/0047 | |
| 10,693,198 B2* | 6/2020 | Ito | H01M 10/48 | |
| 2004/0135544 A1* | 7/2004 | King | B60W 10/26 | 320/116 |
| 2004/0135545 A1* | 7/2004 | Fowler | B60W 10/26 | 320/118 |
| 2004/0135546 A1* | 7/2004 | Chertok | H02J 7/0016 | 320/118 |
| 2004/0164706 A1* | 8/2004 | Osborne | H02J 7/0018 | 320/116 |
| 2008/0156551 A1* | 7/2008 | Kawahara | B60L 58/22 | 701/22 |
| 2008/0191663 A1* | 8/2008 | Fowler | B60L 53/11 | 320/118 |
| 2008/0252257 A1* | 10/2008 | Sufrin-Disler | G01R 31/396 | 320/118 |
| 2009/0027009 A1* | 1/2009 | Sivertsen | B60L 58/22 | 320/134 |
| 2009/0067200 A1* | 3/2009 | Bolz | H02J 7/0014 | 363/17 |
| 2009/0146610 A1 | 6/2009 | Trigiani | | |
| 2010/0085009 A1* | 4/2010 | Kang | H02J 7/0016 | 320/118 |
| 2010/0138072 A1* | 6/2010 | Wang | H02J 7/0013 | 700/298 |
| 2010/0207579 A1* | 8/2010 | Lee | H02J 7/0018 | 320/120 |
| 2010/0225277 A1 | 9/2010 | Ochi et al. | | |
| 2010/0231166 A1* | 9/2010 | Lee | H02J 7/0021 | 320/118 |
| 2010/0277123 A1* | 11/2010 | Lim | H02J 7/0014 | 320/116 |
| 2010/0289337 A1* | 11/2010 | Stauth | H02J 3/381 | 307/77 |
| 2010/0295383 A1* | 11/2010 | Cummings | H02J 3/00 | 307/151 |
| 2011/0074354 A1* | 3/2011 | Yano | H01M 10/441 | 320/116 |
| 2011/0089898 A1* | 4/2011 | Lee | H02J 7/34 | 320/116 |
| 2011/0144840 A1* | 6/2011 | Ye | B60K 6/46 | 701/22 |
| 2011/0285352 A1* | 11/2011 | Lim | H02J 7/0019 | 320/118 |
| 2012/0025769 A1* | 2/2012 | Kikuchi | G01R 31/396 | 320/118 |
| 2012/0032638 A1 | 2/2012 | Jung | | |
| 2012/0086390 A1* | 4/2012 | Lim | H02J 7/0019 | 320/107 |
| 2012/0187774 A1* | 7/2012 | Tabatabaei | H02J 7/0019 | 307/109 |
| 2012/0223677 A1* | 9/2012 | Yamauchi | H02J 7/0014 | 320/116 |
| 2013/0026991 A1* | 1/2013 | Roessler | H02J 7/0016 | 320/116 |
| 2013/0038290 A1* | 2/2013 | Chatroux | B60L 3/0046 | 320/119 |
| 2013/0093248 A1* | 4/2013 | Liu | H02J 7/007 | 307/77 |
| 2013/0293006 A1 | 11/2013 | Kang et al. | | |
| 2014/0001866 A1* | 1/2014 | Abe | H02J 1/00 | 307/77 |
| 2014/0028098 A1* | 1/2014 | Trigiani | H02J 7/0026 | 307/39 |
| 2014/0035532 A1* | 2/2014 | Brandl | H02J 7/0018 | 320/128 |
| 2014/0042974 A1* | 2/2014 | Yang | H02J 7/0014 | 320/119 |
| 2014/0084868 A1* | 3/2014 | Yun | H02J 7/0063 | 320/118 |
| 2014/0306666 A1 | 10/2014 | Choi et al. | | |
| 2015/0028817 A1* | 1/2015 | Brockerhoff | B60L 58/19 | 320/137 |
| 2015/0042283 A1* | 2/2015 | Camp | H01M 10/486 | 320/121 |
| 2015/0104673 A1* | 4/2015 | de Greef | B60L 3/12 | 429/7 |
| 2015/0244191 A1 | 8/2015 | Matsumura et al. | | |
| 2016/0084913 A1* | 3/2016 | Lupo | G01R 31/3842 | 702/63 |
| 2017/0244257 A1 | 8/2017 | Sung et al. | | |
| 2017/0288422 A1* | 10/2017 | Yang | H01M 10/482 | |
| 2018/0040922 A1* | 2/2018 | Sung | H01M 10/42 | |
| 2018/0083460 A1* | 3/2018 | Min | H02J 7/0019 | |
| 2018/0145519 A1* | 5/2018 | Trigiani | H02J 7/0014 | |
| 2018/0309172 A1* | 10/2018 | Ito | H01M 10/44 | |
| 2019/0252735 A1* | 8/2019 | Sung | H01M 10/48 | |
| 2019/0356025 A1* | 11/2019 | Sung | H02J 7/0021 | |
| 2019/0356143 A1* | 11/2019 | Lee | G01R 31/3835 | |
| 2019/0361075 A1* | 11/2019 | Lee | G01R 31/3835 | |
| 2020/0106278 A1* | 4/2020 | Sung | H02J 50/40 | |
| 2020/0153262 A1* | 5/2020 | Yoon | H01M 10/441 | |
| 2021/0082480 A1* | 3/2021 | Sung | H02J 7/00304 | |
| 2021/0083485 A1* | 3/2021 | Sung | H02J 7/0016 | |

FOREIGN PATENT DOCUMENTS

| | | |
|---|---|---|
| JP | 2012-507132 A | 3/2012 |
| JP | 2014-103785 A | 6/2014 |
| JP | 2015-65796 A | 4/2015 |
| JP | 2015-119580 A | 6/2015 |
| KR | 10-2010-0098550 A | 9/2010 |
| KR | 10-2012-0077482 A | 7/2012 |
| KR | 10-2013-0123098 A | 11/2013 |
| KR | 10-2014-0038746 A | 3/2014 |

(56) References Cited

FOREIGN PATENT DOCUMENTS

| KR | 10-1387658 B1 | 4/2014 |
|---|---|---|
| KR | 10-2014-0070149 A | 6/2014 |
| KR | 10-2014-0079628 A | 6/2014 |
| KR | 10-1402802 B1 | 6/2014 |
| KR | 10-2014-0123164 A | 10/2014 |
| KR | 10-2016-0041494 A | 4/2016 |
| WO | WO 2009/051415 A2 | 4/2009 |

OTHER PUBLICATIONS

International Search Report (PCT/ISA/210) issued in PCTKR2018/000412, dated Apr. 23, 2018.

* cited by examiner

APPARATUS AND METHOD FOR BATTERY MODULE EQUALIZATION

TECHNICAL FIELD

This application claims priority to and the benefit of Korean Patent Application Nos. 10-2017-0064203 and 10-2017-0090340 filed in the Korean Intellectual Property Office on May 24, 2017 and Jul. 17, 2017, the entire contents of which are incorporated herein by reference.

The present invention relates to an apparatus and a method of equalizing a battery module, and more particularly, to an apparatus and a method of equalizing a battery module, which supply an equalization current to a battery module which is diagnosed to have abnormality via an equalization current supply circuit when abnormality is generated in a state of charge (SoC) of one or more battery modules, and equalize the SoC of the one or more battery modules.

BACKGROUND ART

In general, a secondary battery may be used as one battery module by joining a plurality of unit secondary battery cells in an environment requiring a high capacity, such as an electric vehicle, an energy storage system, and an uninterruptible power supply, and the plurality of battery modules may be joined and used depending on the case.

When the plurality of battery modules is used together, a voltage of the plurality of battery modules may be imbalanced due to various reasons, such as a deviation generated during the production of the battery module and a temperature deviation of the battery module.

In the meantime, when the battery modules having imbalanced voltages are joined and used, there is a problem in that available capacities and power of the plurality of battery modules are decreased and aging of the battery module is accelerated to decrease a life span of the battery module.

In this respect, in order to solve the problem generated when the battery modules having the imbalanced voltages are joined and used, the present inventor invented an apparatus and a method of equalizing a battery module, which supply an equalization current to a battery module which is diagnosed to have abnormality via an equalization current supply circuit when the abnormality is generated in a state of charge (SoC) of one or more battery modules and equalize the SoC of the one or more battery modules.

DETAILED DESCRIPTION OF THE INVENTION

Technical Problem

The present invention is conceived to solve the foregoing problems, and is to provide an apparatus and a method of equalizing a battery module, which control one or more switching units included in one or more cell module controllers (CMCs), respectively, based on a location of a battery module which is diagnosed to have abnormality when the abnormality is generated in a state of charge (SoC) of one or more battery modules, form an equalization current supply circuit that is a closed circuit including a battery module controller (BMC) and the battery module which is diagnosed to have the abnormality, and supply an equalization current to the battery module which is diagnosed to have the abnormality via the equalization current supply circuit, thereby equalizing the SoC of the one or more battery modules.

Technical Solution

An apparatus for equalizing a battery module according to an exemplary embodiment of the present invention includes: one or more cell module controllers (CMCs) which are connected with one or more battery modules, respectively, and measure voltages of both ends of a connected battery module among the one or more battery modules, respectively; and a battery module controller (BMC) which calculates a state of charge (SoC) of each of the one or more battery modules based on the measured voltages of both ends of each battery module, and diagnoses abnormality of each of the one or more battery modules based on the calculated SoC, and the BMC controls one or more switches included in the one or more CMCs, respectively, based on a location of the battery module which is diagnosed to have the abnormality among the one or more battery modules, forms an equalization current supply circuit that is a closed circuit including the BMC and the battery module which is diagnosed to have the abnormality, and supplies an equalization current to the battery module which is diagnosed to have the abnormality via the equalization current supply circuit.

In the exemplary embodiment, the BMC may form the equalization current supply circuit by controlling the switch included in the CMC connected with each battery module which is diagnosed to have the abnormality and a CMC connected to a front end of the CMC connected with the battery module which is diagnosed to have the abnormality.

In the exemplary embodiment, when the abnormality is not diagnosed in the one or more battery modules, the one or more CMCs may maintain the one or more switches in an off state, and when there is the battery module which is diagnosed to have the abnormality among the one or more battery modules, the BMC may control a state of the switch included in the CMC connected with each battery module which is diagnosed to have the abnormality and a CMC connected to a front end of the CMC connected with the battery module which is diagnosed to have the abnormality among the one or more switches in an on-state and form the equalization current supply circuit including the battery module which is diagnosed to have the abnormality.

In the exemplary embodiment, the BMC may include an auxiliary switch which controls an electrical conduction state with a CMC located at the first end among the one or more CMCs, and when it is diagnosed that a battery module located at a first end has the abnormality, the BMC may form the equalization current supply circuit so as to include the battery module located at the first end by controlling electrical conduction states of the switch included in the CMC located at the first end and the auxiliary switch.

In the exemplary embodiment, the apparatus may further include an equalization BUS and a communication BUS which connect the one or more CMCs and the BMC, in which the equalization BUS and the communication BUS may connect the one or more CMCs and the BMC by a daisy chain connection with a first end and a last end.

In the exemplary embodiment, the equalization BUS may include: a positive BUS which serially connects one or more CMCs located at odd-numbered places based on the CMC located at the last end among the one or more CMCs; and a negative BUS which serially connects one or more CMCs located at even-numbered places based on the CMC located at the last end.

In the exemplary embodiment, each of the one or more CMCs may further include: a connector which selectively connects the battery module connected to each of the CMCs, the switch included in each of the CMCs, and the equalization BUS; a voltage sensor which measures voltages of both ends of the battery module connected to each of the CMCs; a fuse which connects a negative electrode of the battery module connected to each of the CMCs and the one or more switches; a balancer which discharges the battery module connected to each of the CMCs; and a controller which controls an operation of the balancer based on the measured voltage.

In the exemplary embodiment, the BMC may include: an equalization current supplier which supplies the equalization current to the battery module which is diagnosed to have the abnormality; and a voltage sensor which measures a voltage of the equalization BUS, and positive terminals of the equalization current supplier and the voltage sensor may be connected with the positive BUS, and negative terminals of the equalization current supplier and the voltage sensor may be connected with the negative BUS.

In the exemplary embodiment, the BMC may form a module location identifying circuit by controlling a switch included in a CMC of which a location is desired to be recognized among the one or more CMCs, and identify the location of the CIVIC of which the location is desired to be recognized based on a voltage applied to the module location identifying circuit.

A method of equalizing a battery module by a battery module equalizing apparatus according to another exemplary embodiment of the present invention includes: measuring voltages of both ends of one or more battery modules connected to one or more cell module controllers (CMCs), respectively; diagnosing an abnormality of each of the one or more battery modules based on a state of charge (SOC) of each of the one or more battery modules calculated based on the measured voltages of both ends of each of the one or more battery modules; and controlling one or more switches included in the one or more CMCs, respectively, based on a location of the battery module which is diagnosed to have the abnormality among the one or more battery modules, and forming an equalization current supply circuit that is a closed circuit including an equalization current supplier that supplies an equalization current and the battery module which is diagnosed to have the abnormality.

In the exemplary embodiment, the supplying of the equalization current may include forming the equalization current supply circuit by controlling the switch included in each of the CMCs connected with the battery module which is diagnosed to have the abnormality and a CMC connected to a front end of the CMC connected with the battery module which is diagnosed to have the abnormality.

In the exemplary embodiment, the method may further include when the abnormality is not diagnosed in the one or more battery modules, maintaining the one or more switches in an off state, in which the supplying of the equalization current may include, when there is the battery module which is diagnosed to have the abnormality among the one or more battery modules, controlling a state of the switch included in each of the CMCs connected with the battery module which is diagnosed to have the abnormality and a CMC connected to a front end of the CMC connected with the battery module which is diagnosed to have the abnormality among the one or more switches in an on-state and forming the equalization current supply circuit including the battery module which is diagnosed to have the abnormality.

In the exemplary embodiment, the supplying of the equalization current may include when it is diagnosed that a battery module located at a first end has abnormality, forming the equalization current supply circuit so as to include the battery module located at the first end by controlling electrical conduction states of the switch included in the CMC located at the first end and the auxiliary switch connected with the CMC located at the first end among the one or more CMCs.

In the exemplary embodiment, the method may further include connecting, by an equalization BUS and a communication BUS, the one or more CMCs and the BMC, in which the equalization BUS and the communication BUS may connect the one or more CMCs and the BMC by a daisy chain connection with a first end and a last end.

In the exemplary embodiment, the equalization BUS may include: a positive BUS which serially connects one or more CMCs located at odd-numbered places based on the CMC located at the last end among the one or more CMCs; and a negative BUS which serially connects one or more CMCs located at even-numbered places based on the CMC located at the last end.

In the exemplary embodiment, the measuring of each of the voltages may include: selectively connecting the battery module connected to each of the CMCs, the switch included in each of the CMCs, and the equalization BUS; measuring voltages of both ends of the battery module connected to each of the CMCs; connecting a negative electrode of the battery module connected to each of the CMCs and the one or more switches; and discharging the battery module connected to each of the CMCs.

In the exemplary embodiment, the supplying of the equalization current may include: supplying the equalization current to the battery module which is diagnosed to have the abnormality; and measuring a voltage of the equalization BUS, and positive terminals of the equalization current supplier and a voltage sensor may be connected with the positive BUS, and negative terminals of the equalization current supplier and the voltage sensor may be connected with the negative BUS.

In the exemplary embodiment, the supplying of the equalization current may include: forming a module location identifying circuit by controlling a switch included in a CMC of which a location is desired to be recognized among the one or more OMCs; and identifying the location of the CMC of which the location is desired to be recognized based on a voltage applied to the module location identifying circuit.

Advantageous Effects

The present invention controls one or more switching units included in one or more cell module controllers (CMCs), respectively, based on a location of a battery module which is diagnosed to have abnormality when the abnormality is generated in a state of charge (SoC) of one or more battery modules, forms an equalization current supply circuit that is a closed circuit including a battery module controller (BMC) and the battery module which diagnosed to have the abnormality, and supplies an equalization current to the battery module which is diagnosed to have the abnormality via the equalization current supply circuit, thereby having an advantage in equalizing the SoC of the one or more battery modules.

Further, the present invention forms a module location identifying circuit by controlling a switching unit of one or more cell module controllers (CMCs) connected with the one or more battery modules, respectively, and identifies a location of the CMC based on a voltage applied to the module location identifying circuit, thereby having an advantage in identifying the location of the CMC without adding a separate constituent element.

BEST MODE

Hereinafter, an exemplary embodiment is presented for helping understanding of the present invention. However, the exemplary embodiment below is simply provided for more easy understanding of the present invention, and the contents of the present invention are not limited by the exemplary embodiment.

Figure 1:
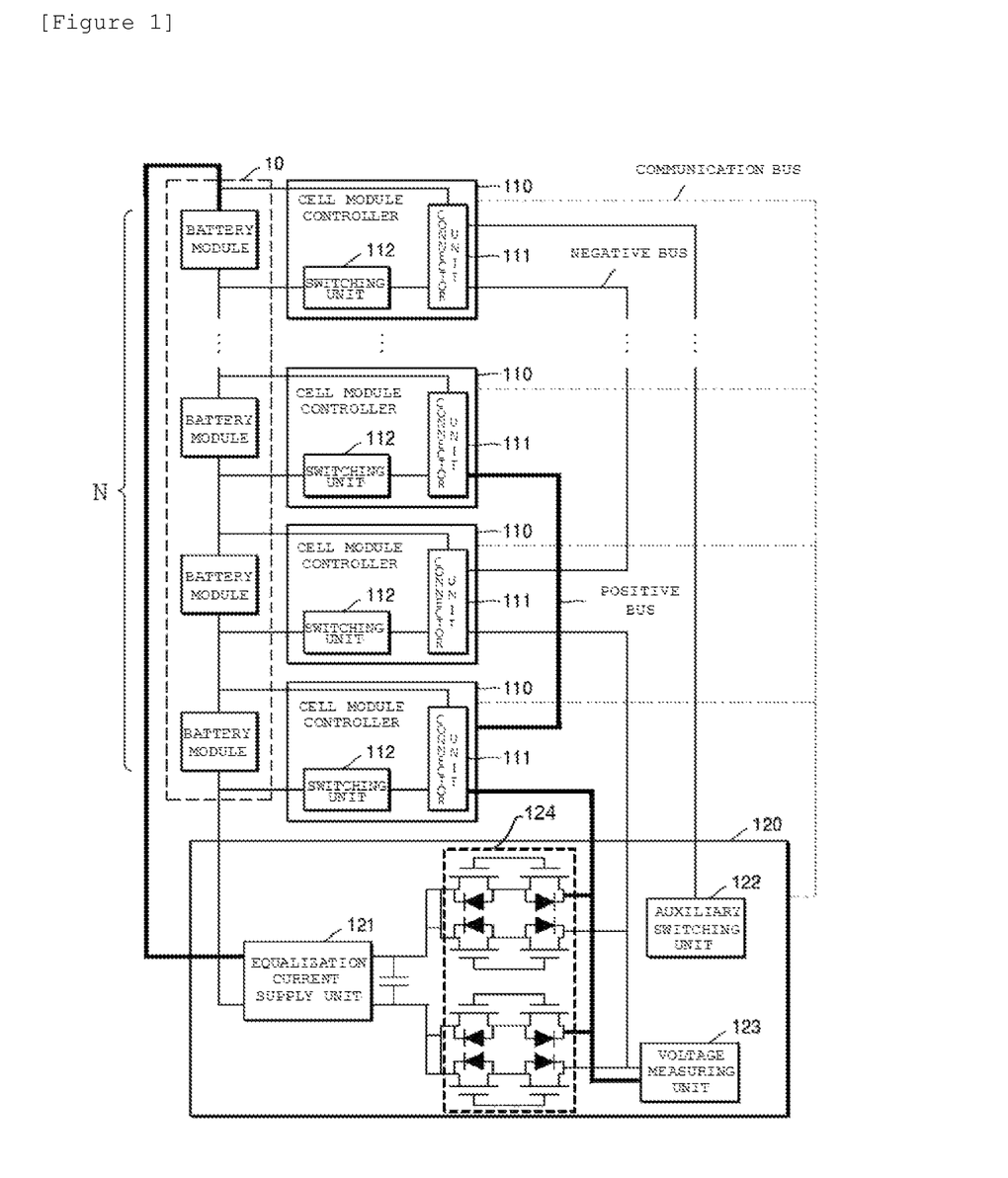
FIG. 1 is a diagram schematically illustrating constituent elements of a battery module equalizing apparatus 100 according to an exemplary embodiment of the present invention.

FIG. 1 is a diagram schematically illustrating constituent elements of a battery module equalizing apparatus 100 according to an exemplary embodiment of the present invention.

Referring to FIG. 1, a battery module equalizing apparatus 100 according to an exemplary embodiment of the present invention may include one or more cell module controllers (CMCs) 110 and a battery module controller (BMC) 120.

First, one or more CMCs 110 may be connected to one or more battery modules 10, respectively. One or more CMCs 110 may measure voltages of both ends of the battery module connected with one or more CMCs 10 among the one or more battery modules 10, respectively. Hereinafter, one or more CMCs 110 will be described in more detail with reference to FIG. 2.

Figure 2:
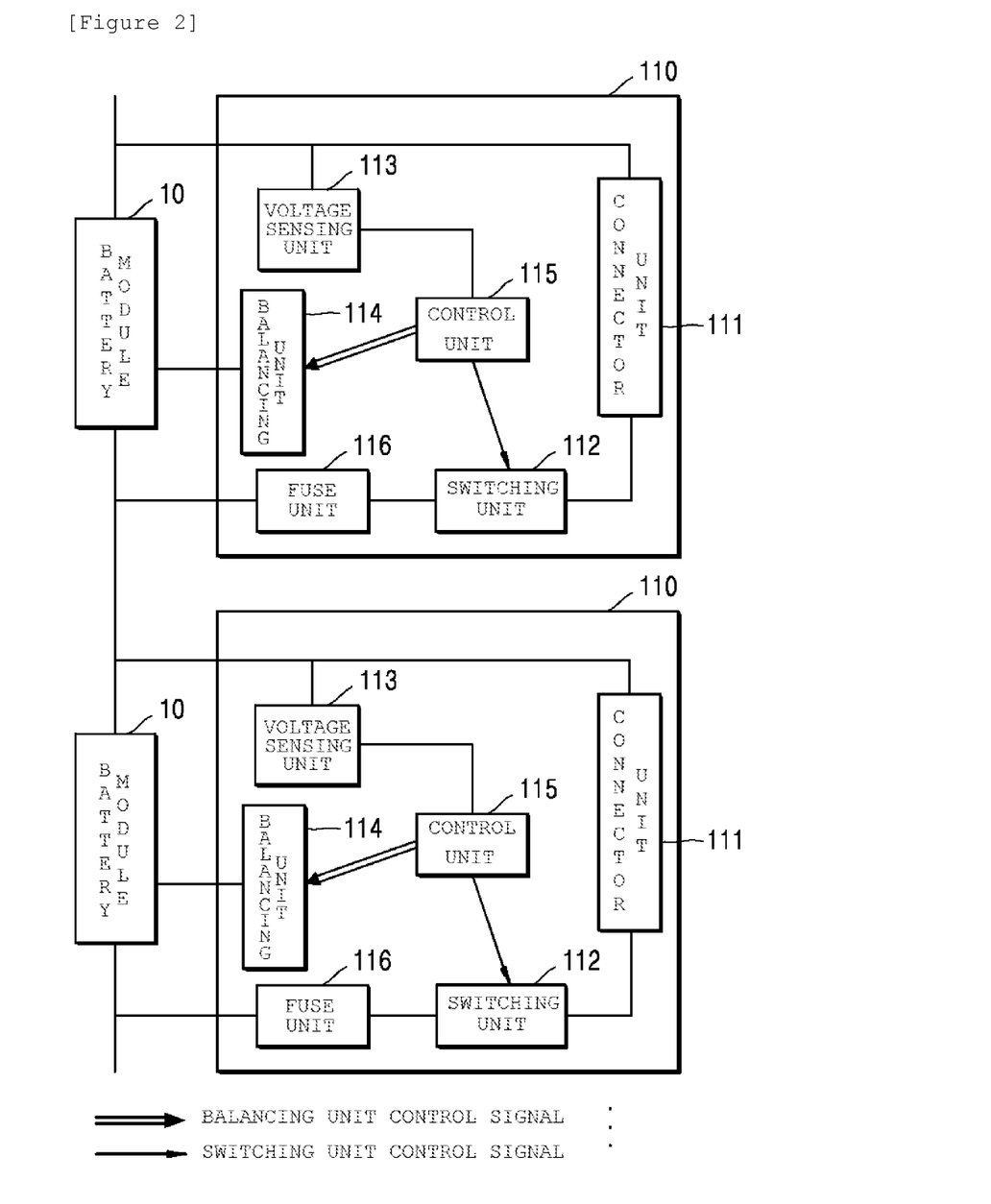
FIG. 2 is a diagram illustrating a cell module controller 110 included in the battery module equalizing apparatus 100 according to the exemplary embodiment of the present invention in more detail.

FIG. 2 is a diagram illustrating the cell module controller 110 included in the battery module equalizing apparatus 100 according to the exemplary embodiment of the present invention in more detail.

Referring to FIG. 2, each of one or more CMCs 110 may include a connector unit 111, a switching unit 112, a voltage sensing unit 113, a balancing unit 114, a control unit 115, and a fuse unit 116.

The connector unit 111 may internally connect a positive terminal of the battery module 10 connected to each of the one or more CMCs 110 and the switching unit 112 included in each of the CMCs 110. Further, the connector unit 111 may externally selectively connect one or more of the positive terminal of the battery module 10 connected to each of the one or more CMCs 110 and the switching unit 112 included in each of the CMCs 110 and an equalization BUS which is to be described below. To this end, the connector unit 111 may be formed by one or more connectors.

The switching unit 112 may control an electrical conduction state between the connector unit 111 and a negative terminal of the batter module 10 connected to each CMC 110. For example, the switching unit 112 may be a switching device, such as a relay, a contactor, a transistor, and a thyristor, and may control an electrical conduction state between the negative terminals of the battery modules 10 connected to the CMCs 110, respectively, according to the electrical conduction state of the switching device. Further, the switching unit 112 may be confirmed by one or more switching devices as necessary.

In the exemplary embodiment, the switching unit 112 included in each of the one or more CMCs 110 may be maintained in an off state when abnormality of the battery module 10 is not diagnosed by the BMC 120 which is to be described below.

The voltage sensing unit 113 may sense voltage values at both ends of the battery module 10 connected to each CMC 110. For example, the voltage sensing unit 113 may be a shunt resistor, and transmit a voltage value applied to the shunt resistor to a control unit 115 which is to be described below. However, the present invention is not limited thereto.

In the exemplary embodiment, the voltage sensing unit 113 may provide the sensed voltage values at both ends of the battery module 10 to the BMC which is to be described below.

The balancing unit 114 may additionally consume power of the connected battery module 10 based on the voltage value of the connected battery module 10. For example, the balancing unit may include one or more switches (not illustrated) and one or more resistors (not illustrated). The balancing unit 114 may receive a balancing unit control signal from the control unit 115 which is to be described below and consume power of the battery module 10 in the form of heat by using the one or more resistors.

The control unit 115 may output a switching unit control signal to the switching unit 112. Herein, the switching unit control signal may be a control signal that is capable of changing an electrical conduction state of the switching unit 112.

In the exemplary embodiment, each of the one or more CMCs 110 may further include a switch driving unit (not illustrated) driving a switch, and when the switching unit control signal is output from the control unit 115, the switch driving unit controls the switching unit 112, thereby changing an electrical conduction state of the switching unit 112.

Further, the control unit 115 may output the balancing unit control signal to the balancing unit 114. Herein, the balancing unit control signal may be a signal controlling an electrical conduction state of a switch included in the balancing unit 114. The control unit 115 changes a state of the switch to an on-state based on the voltage value of the battery module 10 sensed in the voltage sensing unit 113, and consumes power by using the resistor included in the balancing unit 114, thereby enabling the balancing unit 114 to operate.

In the exemplary embodiment, the control unit 115 is one integrated circuit and may include a micro controller unit (MCU) which is capable of controlling a plurality of constituent elements.

The fuse unit 116 may be connected between the negative terminal of the connected battery module 10 and the switching unit 112. In the exemplary embodiment, the fuse unit 116 may include an overcurrent blocking fuse (not illustrated) and a temperature fuse (not illustrated). The overcurrent blocking fuse may operate when an overcurrent flows between the battery module 10 and the switching unit 112 and block the overcurrent of the battery module 10. The temperature fuse may be located to be adjacent to the balancing unit, and the temperature fuse operates when a temperature generated in the balancing unit is equal to or higher than a reference temperature, thereby preventing the battery module 10 and the CMC 110 from being damaged due to an over-temperature.

In the exemplary embodiment, each of the one or more CMCs 110 may further include a power unit (not illustrated). The power unit may reduce a voltage of the battery module 10 and provide the reduced voltage so as for the constituent elements included in one or more CMCs 110 to operate. For example, when the control unit 115 is an MCU, the power unit may reduce a voltage to 3 to 5 V that is a permitted voltage of the MCU and provide the reduced voltage to the control unit 115.

Referring back to FIG. 1, one or more CMCs 110 may be connected by a daisy chain connection scheme. To this end, the battery module equalizing apparatus 100 according to the exemplary embodiment of the present invention may include a communication BUS and the equalization BUS.

The communication BUS may connect the one or more CMCs 10 by the daisy chain connection scheme. The communication BUS may connect each CMC 110 and the BMC 120 which is to be described below, and enable each CMC 110 and the BMC 120 to transceive data.

The equalization BUS may connect the one or more CMCs 110 by the daisy chain connection scheme. To this end, the equalization BUS may be configured by a positive BUS and a negative BUS.

The positive BUS may be a BUS connected from the positive terminal of the battery module 10 located at the first end. The positive BUS may serially connect one or more CMCs 110 located at the odd-numbered places based on the CMC 110 located at the last end among the one or more CMCs 110. For example, when N CMCs 110 are connected to N battery modules 10, respectively (N is an even number), a number of each CMC may be sequentially set from the CMC 110 located at the last to the CMC 110 located at the first end. In this case, the CMC 110 located at the last may be set by number 1, and the positive BUS may connect the first CMC 110, the third CMC 110, the fifth CMC 110, ..., and the N−1$^{th}$ CMC 110.

The negative BUS may be a BUS connected from the negative terminal of the battery module 10 located at the last. The negative BUS may serially connect one or more CMCs 110 located at the even-numbered places based on the CMC 110 located at the last among the one or more CMCs 110. For example, when the CMC 110 located at the last is set by number 1, the negative BUS may connect the second CMC 110, the fourth CMC 110, the sixth CMC 110, ..., and the N$^{th}$ CMC 110.

The BMC 120 may calculate a state of charge (SoC) of one or more battery modules based on the voltages of both ends of the one or more battery modules 10 measured from one or more CMCs 110, and diagnose abnormality of each of the one or more battery modules 10 based on the calculated SoC. For example, the BMC 120 may measure a voltage of the one or more battery modules 10, and compare the measured voltage with a discharge curve of the corresponding battery module 10 and calculate an SoC. The BMC 120 may compare the calculated SoC with a reference SoC value, select the battery module 10 of which the calculated SoC is equal to or smaller than the reference SoC value, and diagnose that the selected battery module 10 has abnormality. Herein, the reference SoC value may mean a minimum SoC value calculated when the battery module 10 is a normal state, and may be set by various values according to the kind of battery module 10 and a demand of a user.

In the exemplary embodiment, the BMC 120 controls the one or more switching units included in the one or more CMCs 110, respectively, based on a location of the battery module which is diagnosed to have the abnormality among the one or more battery modules 10, thereby forming an equalization current supply circuit that is a closed circuit including the BMC 120 and the battery module 10 which is diagnosed to have the abnormality. Further, the BMC 120 may supply an equalization current to the battery module 10 which is diagnosed to have the abnormality via the formed equalization current supply circuit. Hereinafter, a series of processes of forming the equalization current supply circuit and supplying an equalization current to the battery module 10 having the abnormality via the formed equalization current supply circuit by the BMC 120 will be described with reference to FIGS. 3 and 4.

Figure 3:
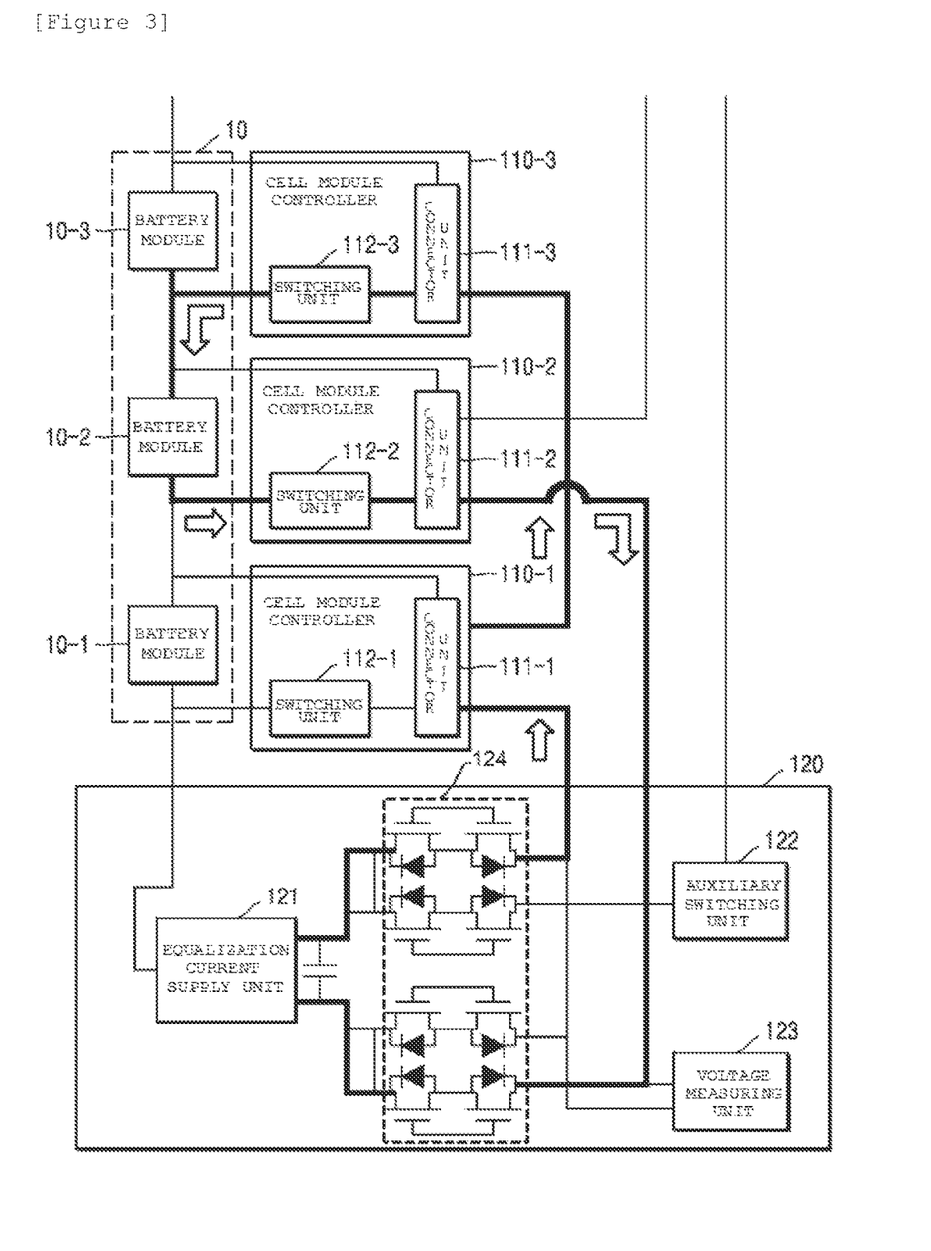
FIG. 3 is a diagram schematically illustrating an equalization current supply circuit formed in the battery module equalizing apparatus 100 according to the exemplary embodiment of the present invention.

FIG. 3 is a diagram schematically illustrating the equalization current supply circuit formed in the battery module equalizing apparatus 100 according to the exemplary embodiment of the present invention.

Referring to FIG. 3, the BMC 120 may supply an equalization current to the battery module 10 which is diagnosed to have abnormality via the equalization current supply circuit. To this end, the BMC 120 may include an equalization current supply unit 121.

The equalization current supply unit 121 may receive a voltage from one or more battery modules 10, convert the received voltage to a voltage having a predetermined size, and transmit the received voltage to the battery module 10 having the abnormality. For example, the equalization current supply unit 121 may be an isolated converter, such as a DC-DC converter. However, the present invention is not limited thereto.

The BMC 120 may form the equalization current supply circuit by controlling the switching unit 112 included in each of the CMCs 110 connected with the battery module 10 which is diagnosed to have the abnormality and the CMC 110 connected to a front end of the CMC 110 connected with the battery module 10 which is diagnosed to have the abnormality. For example, when the battery module 10-1 located at the last end and the CMC 110-1 are set by number 1 and abnormality is generated in the SoC of the battery module 10-2 of number 2, the BMC 120 may output a control signal to the CMC 110-2 of number 2 and the CMC 110-3 of number 3. Herein, the control signal may be a signal controlling the control unit 115 included in one or more CMCs 110 to output the switching control signal. In another exemplary embodiment, the control signal may be a signal directly controlling, by the BMC 120, an electrical conduction state of the switching unit 112 included in the one or more CMCs 110. The CMC 110-2 of number 2 and the CMC 110-3 of number 3 may receive the control signal from the BMC 120, and control the conduction states of the switching units 112-2 and 112-3 included in the CMC 110-2 of number 2 and the CMC 110-3 of number 3, respectively, to be in an on-state. Accordingly, the BMC 120 may form the equalization current supply circuit illustrated in FIG. 3, and the equalization current may be provided to the battery module 10-2 having the abnormality. That is, the equalization current supply circuit may be formed with the connector unit 111-1 of number 1, the connector of number 3 111-3, the switching unit 112-3 of number 3, the negative terminal of the battery module 10-3 of number 3, the battery module 10-2 having the abnormality, the switching unit 112-2 of number 2, the connector unit 111-2 of number 2, and the equalization current supply unit 121. The equalization current supply unit 121 may provide the battery module 10-2 having the abnormality with the equalization current via the equalization current supply circuit formed as described above.

In the meantime, when abnormality is generated in the battery module 10 located at the first end, the CMC 110 is not located at the front end of the CMC 110 located at the first end, so that it may be difficult to form the equalization current supply circuit by the same method as the foregoing method. In order to supplement the difficulty, the BMC 120 may include an auxiliary switching unit 122, and when abnormality is generated in the battery module 10 located at the first end, the equalization current supply circuit may be formed by controlling electrical conduction states of the auxiliary switching unit 122 and the switching unit 112 included in the CMC 110 located at the first end. Hereinafter, this will be described in more detail with reference to FIG. 4.

Figure 4:
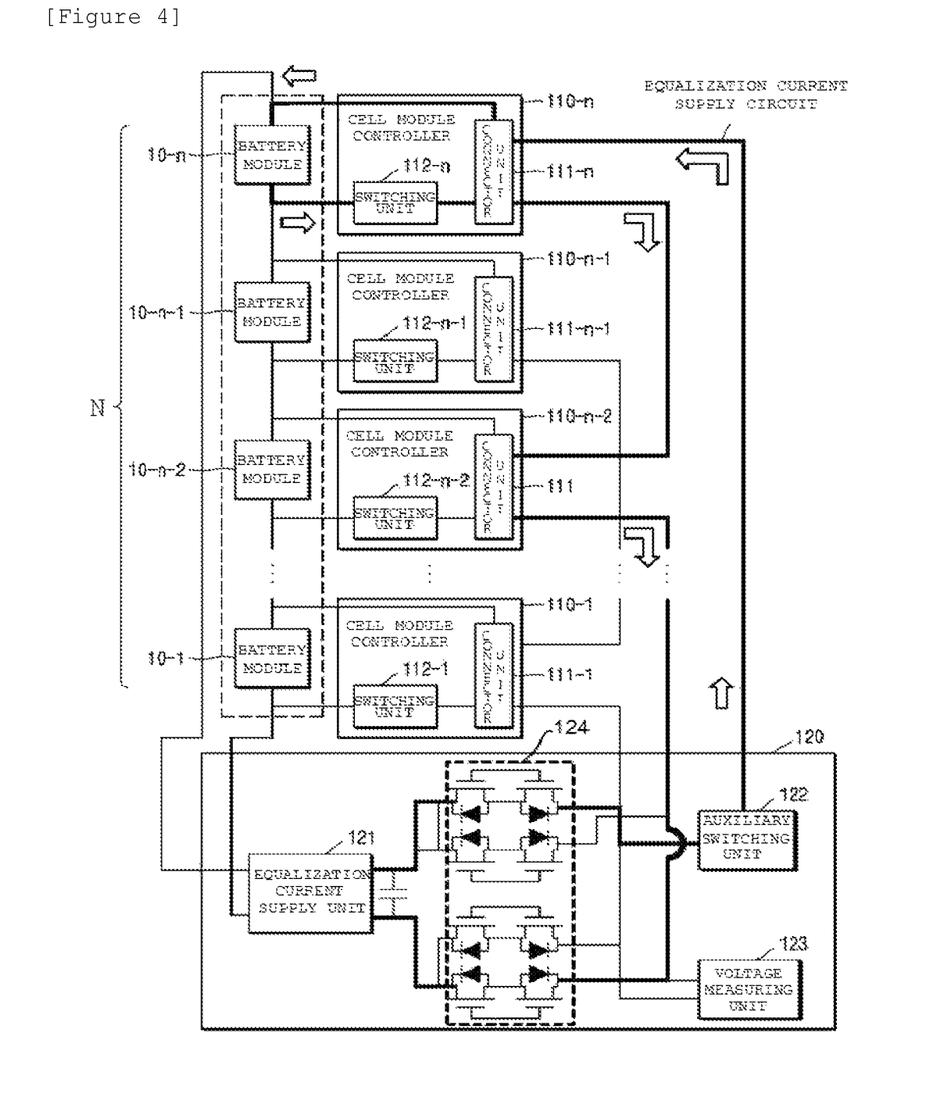
FIG. 4 is a diagram schematically illustrating an equalization current supply circuit formed when abnormality of a battery module located at the first end is diagnosed in the battery module equalizing apparatus 100 according to the exemplary embodiment of the present invention.

FIG. 4 is a diagram schematically illustrating the equalization current supply circuit formed when abnormality of a battery module located at the first end is diagnosed in the battery module equalizing apparatus 100 according to the exemplary embodiment of the present invention.

Referring to FIG. 4, when the battery module 10-$n$ located at the first end has abnormality, the BMC 120 may output a control signal to the CMC 110-$n$ located at the first end and the auxiliary switching unit 122. The switching unit 112-$n$ included in the CMC 110-$n$ located at the first end and the auxiliary switching unit 122 may receive the control signal, and the states of the switching unit 112-$n$ and the auxiliary switching unit 122 may be controlled to an on-state based on the control signal. Accordingly, the equalization current supply circuit illustrated in FIG. 4 is formed, thereby providing an equalization current to the battery module 10-$n$ that has the abnormality and is located at the first end. That is, the equalization current supply circuit may form the equalization current supply circuit including the auxiliary switching unit 122, the connector unit 111-$n$ of the CMC 110-$n$ located at the first end, the battery module 10-$n$ located at the first end, the switching unit 112-$n$ of the CMC 110-$n$ located at the first end, the connector unit 111-$n$ of the CMC 110-$n$ located at the first end, and the connector unit 111-$n$-2 of the even-numbered CMC 110-$n$-2 based on the last end. The equalization current supply unit 121 may provide the battery module 10-$n$ located at the first end with the equalization current via the equalization current supply circuit formed as described above.

In the exemplary embodiment, the BMC 120 may further include an equalization circuit switching unit 124 which is located at an output terminal of the equalization current supply unit 121 and changes an electrical conduction state of the output terminal of the equalization current supply unit 121.

The equalization current switching unit 124 may control the electrical conduction state of the output terminal of the equalization current supply unit 121 in order to form the equalization current supply circuit for supplying the equalization current to the battery module which is diagnosed to have the abnormality. For example, the equalization circuit switching unit 124 may be four single pole single throw (SPST) switches as illustrated in FIGS. 1, and 3 to 6. However, the present invention is not limited thereto, any constituent element which is capable of blocking an output voltage of the output terminal of the equalization current supply unit 121 may be applied.

In the exemplary embodiment, the BMC 120 may form a module location identifying circuit by controlling the switching unit 112 included in the CMC 110 of which a location is desired to be recognized among the one or more CMCs 110. Further, the BMC may identify a location of the CMC 110 of which a location is desired to be recognized based on a voltage applied to the module location identifying circuit. Hereinafter, this will be described in more detail with reference to FIGS. 5 and 6.

Figure 5:
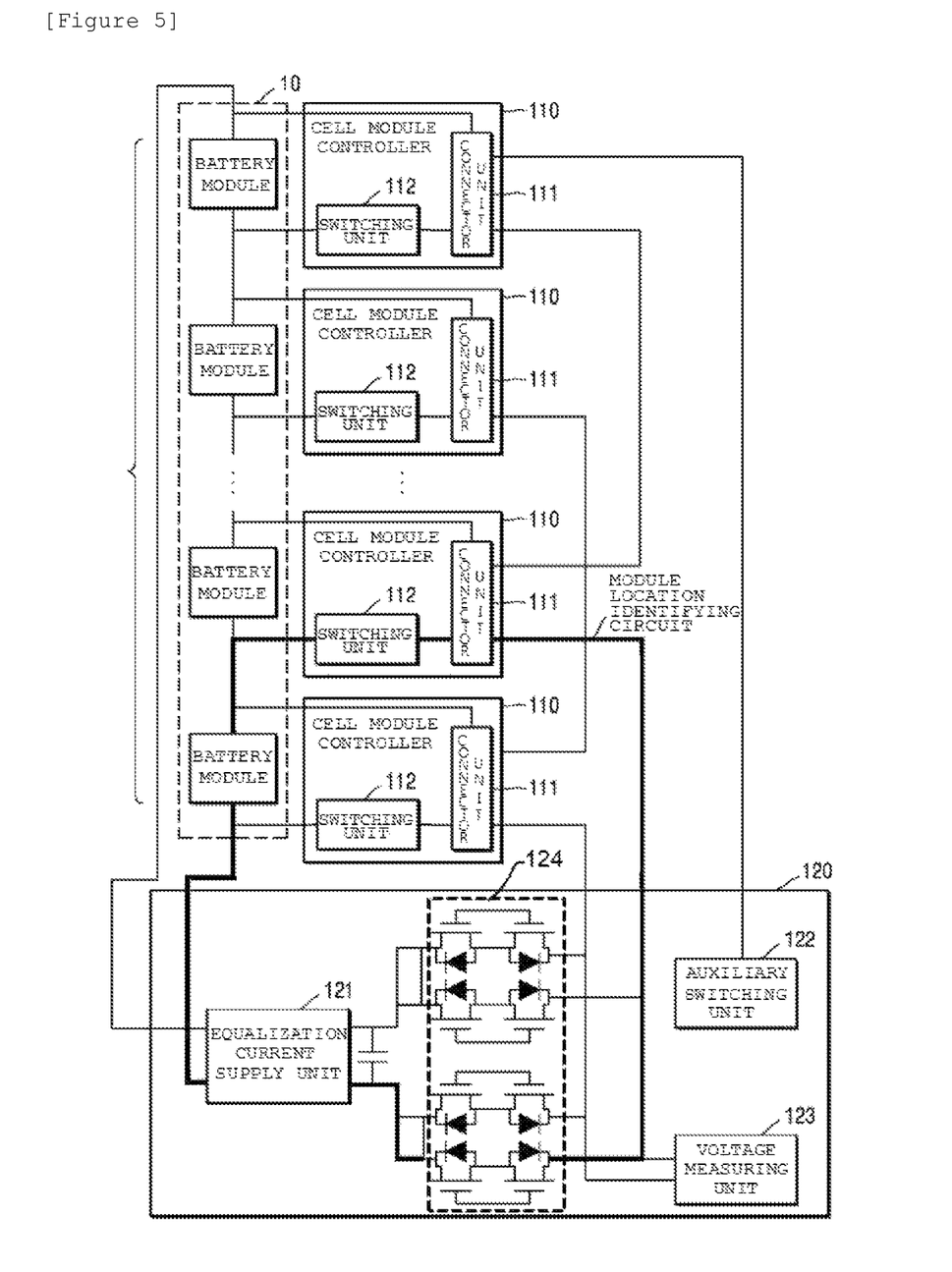
FIG. 5 is a diagram schematically illustrating a module location identifying circuit formed in the battery module equalizing apparatus 100 according to the exemplary embodiment of the present invention.
Figure 6:
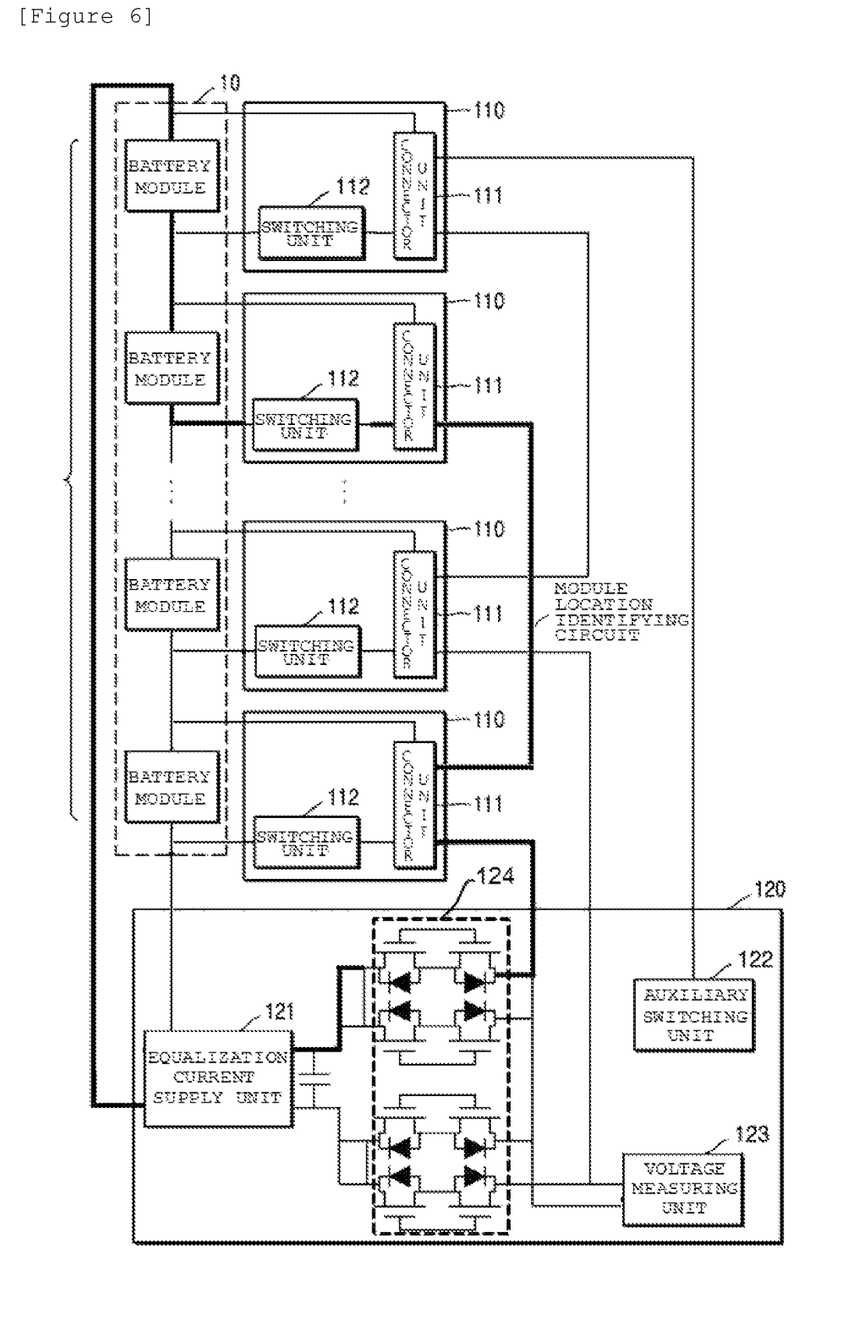
FIG. 6 is a diagram schematically illustrating another form of the module location identifying circuit formed in the battery module equalizing apparatus 100 according to the exemplary embodiment of the present invention.

FIG. 5 is a diagram schematically illustrating a module location identifying circuit formed in the battery module equalizing apparatus 100 according to the exemplary embodiment of the present invention, and FIG. 6 is a diagram schematically illustrating another form of the module location identifying circuit formed in the battery module equalizing apparatus 100 according to the exemplary embodiment of the present invention.

Referring to FIGS. 5 and 6, the BMC 120 may form the module location identifying circuit by controlling the switching unit 112 of the CMC 110 of which a location is desired to be recognized, and identify a location of the corresponding CMC 110 based on a voltage of the formed module location identifying circuit. To this end, the BMC 120 may include a voltage measuring unit 123.

A positive terminal of the voltage measuring unit 123 is connected with the positive BUS and a negative terminal of the voltage measuring unit 123 is connected with the negative BUS, thereby measuring a voltage applied to the module location identifying circuit. For example, when it desires to recognize a location of the CMC 110 located at the front end of the CMC 110 located at the last end, the BMC 120 may control an electrical conduction state of the switching unit 112 included in the CMC 110 of which a location is desired to be recognized, that is, the CMC 110 located at the front end of the CMC 110 located at the last end. Accordingly, the module location identifying circuit illustrated in FIG. 5 may be formed, and the module location identifying circuit may include only one battery module among N battery modules 10. Accordingly, the voltage applied to the module location identifying circuit measured via the voltage measuring unit 123 may be the voltage of one battery module. Further, when it desires to recognize a location of the third-placed CMC 110 based on the CMC 110 located at the last end, the BMC 120 may control an electrical conduction state of the switching unit 112 included in the third-placed CMC 110. Accordingly, the module location identifying circuit illustrated in FIG. 6 may be formed, and the module location identifying circuit may include N−2 battery modules among N battery modules 10. Accordingly, the voltage applied to the module location identifying circuit measured via the voltage measuring unit 123 may be the voltages of N−2 battery modules. That is, when the foregoing method is applied to the case where 10 battery modules 10 having a voltage of 1 V are joined and used, the voltages of 0 V to 9 V may be measured according to the locations of 10 CMCs 110. The BMC 120 may pre-store a voltage value according to the locations of the one or more CMCs 110, and may match the voltage measured via the voltage measuring unit 123 among the pre-stored voltage values with a corresponding voltage value and identify a location of the CMC 110 of which a location is desired to be recognized.

In another exemplary embodiment, the BMC 120 may form the module location identifying circuit for each of one or more CMCs 110 and measure a voltage via the voltage measuring unit 123, and assign an identification number to each of the one or more CMCs 110 based on a size of the measured voltage.

Hereinafter, a method of equalizing the one or more battery modules 10 by using the battery module equalizing apparatus 100 according to the exemplary embodiment of the present invention will be described with reference to FIGS. 7 and 8.

Figure 7:
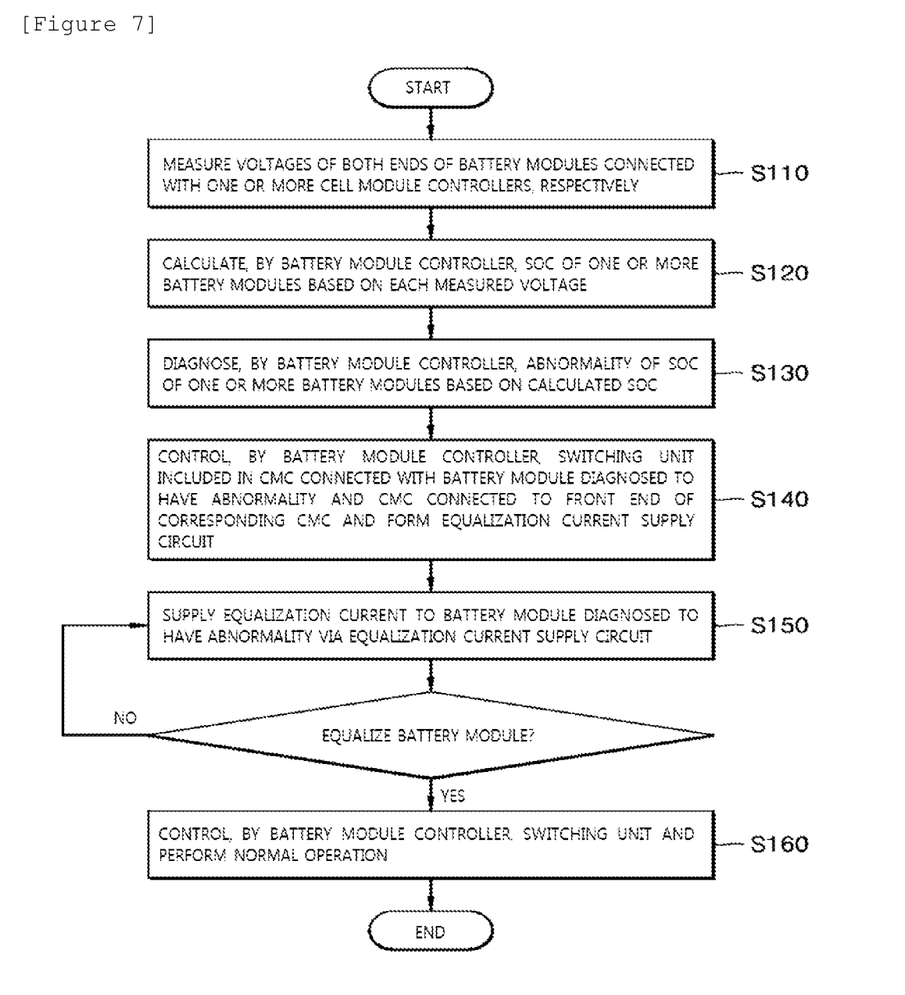
FIG. 7 is a flowchart for describing a series of processes for equalizing one or more battery modules 10 by using the battery module equalizing apparatus 100 according to the exemplary embodiment of the present invention.

FIG. 7 is a flowchart for describing a series of processes for equalizing the one or more battery modules 10 by using the battery module equalizing apparatus 100 according to an exemplary embodiment of the present invention.

First, voltages of both ends of the battery modules connected with one or more CMCs are measured (S110). The BMC may receive the voltages of both ends of the battery module measured in operation S110 and calculate an SoC of each of the one or more battery modules (S120). The BMC diagnoses abnormality of the SoC of each of the one or more battery modules based on the calculated SoC of the one or more battery modules (S130). When the battery modules has abnormality as a result of the diagnosis of the one or more battery modules in operation S130, the states of the switching units included in the CMC connected with the battery module which is diagnosed to have the abnormality and the CMC connected to the front end of the corresponding CMC are controlled to an on-state to form an equalization current supply circuit (S140). The equalization current supply unit supplies an equalization current to the battery module having the abnormality via the equalization current supply circuit formed in operation S140 (S150). The equalization current is supplied in operation S150, so that when the SoC of the one or more battery modules is equalized and has no abnormality, the BMC controls the states of the switching units included in the CMC connected with the battery module which is diagnosed to have the abnormality and the CMC connected to the front end of the corresponding CMC to an off state and performs a normal operation S160. When it is determined that the battery module having the abnormality still has abnormality even after operation S150 is performed, the SoC of the one or more battery modules may be equalized by repeatedly performing operation S150.

Figure 8:
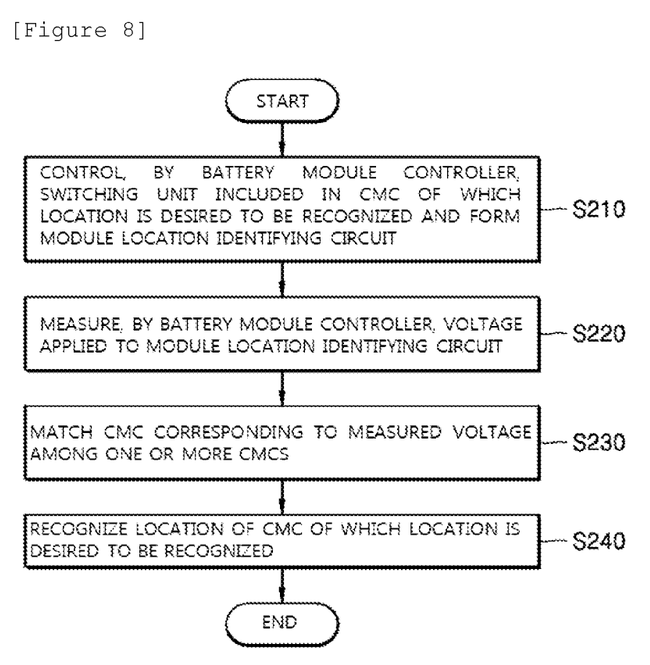
FIG. 8 is a flowchart for describing a series of processes for identifying a location of one or more cell module controllers 110 by using the battery module equalizing apparatus 100 according to the exemplary embodiment of the present invention.

FIG. 8 is a flowchart for describing a series of processes for identifying a location of one or more cell module controllers 110 by using the battery module equalizing apparatus 100 according to the exemplary embodiment of the present invention.

First, the BMC controls a state of a switching unit included in a CMC of which a location is desired to be recognized to an on-state and forms a module location identifying circuit (S210). The BMC measures a voltage applied to the module location identifying circuit formed in operation S210 via the voltage measuring unit (S220). Then, the BMC matches a CMC corresponding to the voltage measured via the voltage measuring unit among the one or more CMCs (S230). The BMC recognizes a location of the CMC of which the location is desired to be recognized based on the CMC matched in operation S230.

The method of equalizing the one or more battery modules 10 and the method of recognizing the location of the CMC by using the battery module equalizing apparatus 100 have been described with reference to the flowcharts presented in the drawings. For a simplified description, the method is illustrated and described with the series of blocks, but the present invention is not limited to the order of the blocks, and some blocks may be occurred in the different order from the order illustrated and described in the present specification or may be occurred with other blocks at the same time, and various other branches, a flow path, and orders of the blocks achieving the same or similar result may be implemented. Further, for the implementation of the method described in the present specification, all of the illustrated blocks may not be required.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. An apparatus for equalizing a battery module, the apparatus comprising:
   two or more cell module controllers (CMCs) which are connected with two or more battery modules, respectively, and measure voltages of both ends of the connected two or more battery modules, respectively; and
   a battery module controller (BMC) which calculates a state of charge (SoC) of each of the two or more battery modules based on the measured voltages of both ends of each battery module, and diagnoses an abnormality of a first battery module among the two or more battery modules based on having a SoC that is equal to or less than a reference SoC,
   wherein the BMC controls two or more switches included in the two or more CMCs, respectively, based on a location of the first battery module, forms an equalization current supply circuit that is a closed circuit including the BMC, the first battery module, a first CMC associated with the first battery module among the two or more CMCs having a first switch among the two or more switches, and a second switch among the two or more switches, and supplies an equalization current to the first battery module via the equalization current supply circuit from at least a second battery module among the two or more battery modules while the BMC controls switches of the remaining battery modules to be turned to an off state.

2. The apparatus of claim 1, wherein the BMC forms the equalization current supply circuit by controlling the first switch included in the first CMC connected with the first battery module which is diagnosed to have the abnormality and a second CMC connected to a front end of the first CMC connected with the first battery module, the second CMC including the second switch.

3. The apparatus of claim 1, wherein in response to an abnormality not being diagnosed in the two or more battery modules, the two or more CMCs maintain the two or more switches in an off state, and in response to the first battery module which is diagnosed to have the abnormality among the two or more battery modules, the BMC controls a state of the first switch included in the first CMC and the second switch of a second CMC connected to a front end of the first CMC to an on-state and forms the equalization current supply circuit including the first battery module.

4. The apparatus of claim 1, wherein the BMC further includes an auxiliary switch which controls an electrical conduction state with a CMC located at a first end among the two or more CMCs, and when it is diagnosed that a battery module among the two or more battery modules located at the first end has the abnormality, the BMC forms the equalization current supply circuit so as to include the battery module located at the first end by controlling electrical conduction states of the switch included in the CMC located at the first end and the auxiliary switch.

5. The apparatus of claim 1, wherein the BMC forms a module location identifying circuit by controlling a switch included in a CMC of which a location is desired to be recognized among the two or more CMCs, and identifies the location of the CMC of which the location is desired to be recognized based on a voltage applied to the module location identifying circuit.

6. The apparatus of claim 1, further comprising:
an equalization BUS and a communication BUS which connect the two or more CMCs and the BMC,
wherein the equalization BUS and the communication BUS connect the two or more CMCs and the BMC by a daisy chain connection with a first end and a last end.

7. The apparatus of claim 6, wherein the BMC includes:
an equalization current supplier which supplies the equalization current to the first battery module which is diagnosed to have the abnormality; and
a voltage sensor which measures a voltage of the equalization BUS,
wherein positive terminals of the equalization current supplier and the voltage sensor are connected with the positive BUS, and negative terminals of the equalization current supplier and the voltage sensor are connected with the negative BUS.

8. The apparatus of claim 6, wherein the equalization BUS includes:
a positive BUS which serially connects two or more CMCs located at odd-numbered places based on the CMC located at the last end among the two or more CMCs; and
a negative BUS which serially connects two or more CMCs located at even-numbered places based on the CMC located at the last end.

9. The apparatus of claim 8, herein each of the two or more CMCs further includes:
a connector which selectively connects the respective battery module, the switch included in each of the CMCs, and the equalization BUS;
a voltage sensor which measures voltages of both ends of the respective battery module;
a fuse which connects a negative electrode of the respective battery module and the two or more switches;
a balancer which discharges the respective battery module; and a controller which controls an operation of the balancer based on the measured voltage.

10. A method of equalizing a battery module by a batter module equalizing apparatus, the method comprising:
measuring voltages of both ends of two or more battery modules connected to two or more cell module controllers (CMCs), respectively;
diagnosing, by a batter module controller (BMC) an abnormality of a first battery, module among the two or more battery modules based on having an SoC that is equal to or less than a reference SoC, the SoC of the first battery module being based on the measured voltages of both ends of the first battery module;
controlling, by the BMC, two or more switches included in the two or more CMCs, respectively, based on a location of the first battery module;
forming an equalization current supply circuit that is a closed circuit including:
the BMC, the BMC including an equalization current supplier that supplies an equalization current to the first battery module from at least a second battery module;
the first battery module;
a first CMC associated with the first battery module among the two or more CMCs, the first CMC having a first switch among the two or more switches; and
a second switch among the two or more switches; and
supplying an equalization current to the first battery module via the equalization current supplier from the at least second battery module while the BMC controls switches of the remaining battery modules to be turned to an off state.

11. The method of claim 10, wherein the supplying of the equalization current includes forming the equalization current supply circuit by controlling, by the BMC, the first switch included in the first CMC connected with the first battery module which is diagnosed to have the abnormality and a second CMC connected to a front end of the first CMC connected with the first battery module, the second CMC including the second.

12. The method of claim 10, further comprising:
in response to an abnormality not being diagnosed in the two or more battery modules, maintaining the two or more switches in an off state,
wherein the supplying of the equalization current includes, in response to the first battery module being diagnosed to have the abnormality among the two or more battery modules, controlling a state of the first switch included in the first CMC connected with the first battery module and the second switch of a second CMC connected to a front end of the first CMC to an on-state and forming the equalization current supply circuit including the first battery module.

13. The method of claim 10, wherein the supplying of the equalization current includes when it is diagnosed that a battery module, among the two or more battery modules, located at a first end has abnormality, forming the equalization current supply circuit so as to include the battery module located at the first end by controlling electrical conduction states of the switch included in the CMC located at the first end and the auxiliary switch connected with the CMC located at the first end among the two or more CMCs.

14. The method of claim 10, wherein the supplying of the equalization current includes:

forming a module location identifying circuit by controlling a switch included in a CMC of which a location is desired to be recognized among the two or more CMCs; and identifying the location of the CMC of which the location is desired to be recognized based on a voltage applied to the module location identifying circuit.

15. The method of claim 10, further comprising:

connecting, by an equalization BUS and a communication BUS, the two or more CMCs and the BMC, wherein the equalization BUS and the communication BUS connect the two or more CMCs and the BMC by a daisy chain connection with a first end and a last end.

16. The method of claim 15, wherein the supplying of the equalization current includes:

supplying the equalization current to the first battery module which is diagnosed to have the abnormality; and measuring a voltage of the equalization BUS, wherein positive terminals of the equalization current supplier and the voltage sensor are connected with the positive BUS, and negative terminals of the equalization current supplier and the voltage sensor are connected with the negative BUS.

17. The method of claim 15, wherein the equalization BUS includes:

a positive BUS which serially connects two or more CMCs located at odd-numbered places based on the CMC located at the last end among the two or more CMCs, and a negative BUS which serially connects two or more CMCs located at even-numbered places based on the CMC located at the last end.

18. The method of claim 17, wherein the measuring of each of the voltages includes:

selectively connecting the respective battery module connected to each of the CMCs, the switch included in each of the CMCs, and the equalization BUS;

measuring voltages of both ends of the respective battery module connected to each of the CMCs;

connecting a negative electrode of the respective battery module connected to each of the CMCs and the two or more switches; and discharging the battery module connected to each of the CMCs.

* * * * *